(12) United States Patent
Morgan

(10) Patent No.: US 8,949,426 B2
(45) Date of Patent: Feb. 3, 2015

(54) AGGREGATION OF MARGINAL SUBSCRIPTION OFFSETS IN SET OF MULTIPLE HOST CLOUDS

(75) Inventor: Christopher Edwin Morgan, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1048 days.

(21) Appl. No.: 12/954,400

(22) Filed: Nov. 24, 2010

(65) Prior Publication Data

US 2012/0131195 A1    May 24, 2012

(51) Int. Cl.
- *G06F 15/173* (2006.01)
- *G06F 15/16* (2006.01)
- *G06F 9/50* (2006.01)

(52) U.S. Cl.
CPC .................................... *G06F 9/5072* (2013.01)
USPC .......................................... 709/226; 709/203

(58) Field of Classification Search
CPC ... G06F 9/5072; G06F 9/5027; G06F 9/4856; G06F 9/5077; G06F 11/3006; G06Q 30/04; H04L 47/72; H04L 47/783
See application file for complete search history.

(56) References Cited

U.S. PATENT DOCUMENTS

| | | | |
|---|---|---|---|
| 6,463,457 B1 | 10/2002 | Armentrout et al. | |
| 6,968,323 B1 * | 11/2005 | Bansal et al. | 705/80 |
| 7,313,796 B2 | 12/2007 | Hamilton et al. | |
| 7,439,937 B2 | 10/2008 | Ben-Shachar et al. | |
| 7,499,968 B1 * | 3/2009 | Alexander et al. | 709/203 |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2003/0177176 A1 * | 9/2003 | Hirschfeld et al. | 709/203 |
| 2004/0162902 A1 | 8/2004 | Davis | |

(Continued)

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

(Continued)

*Primary Examiner* — Joshua Joo
*Assistant Examiner* — Younes Naji
(74) *Attorney, Agent, or Firm* — Lowenstein Sandler LLP

(57) ABSTRACT

Embodiments relate to systems and methods for aggregating marginal subscription offsets in a set of multiple host clouds. A set of aggregate usage history data can record consumption of processor, memory, operating system, or other resources subscribed to by a user across multiple host clouds. An entitlement engine can analyze the aggregate usage history data to identify a short-term subscription margin for one or more subscribed resources, such as processor throughput, operating system instances, or other resources reflecting the under or over-consumption of a cloud resource against subscription limits on an hourly or other basis across multiple clouds. The entitlement engine can track the short-term subscription margin for one or multiple resources each hour of a day, and/or over other intervals, and determine the positive or negative subscription offset cost for each interval. The offsets can be combined to generate a net or aggregate subscription offset cost, or to provide other subscription adjustments.

20 Claims, 6 Drawing Sheets

(56) References Cited

U.S. PATENT DOCUMENTS

| | | |
|---|---|---|
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0131335 A1 | 6/2011 | Spaltro et al. |
| 2011/0161462 A1* | 6/2011 | Hussain et al. ............... 709/219 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., www.rpath.com, 3 pgs.

White Paper—"rPath Versus Other Software Appliance Approaches", Mar. 2008, rPath, Inc., www.rpath.com, 9 pgs.

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

(56) References Cited

OTHER PUBLICATIONS

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris et al., "Systems and Methods for Combinatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud" U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "System and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al. "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Macnines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

AGGREGATION OF MARGINAL SUBSCRIPTION OFFSETS IN SET OF MULTIPLE HOST CLOUDS

FIELD

The invention relates generally to systems and methods for aggregating marginal subscription offsets in a set of multiple host clouds, and more particularly, to platforms and techniques for metering and capturing a user's short-term consumption of resources across a set of multiple host clouds, and reconciling the marginal offsets in consumption against the user's resource consumption limits on a combined basis.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the administrative capture of a user's resource consumption that may be spread across several independent host clouds, existing platforms today provide no mechanism by which a resource provider and/or other operator or administrator can track the resource consumption by the user across all currently utilized host clouds, in an organized or centralized fashion. That is, the user may have instantiated a certain number of instances or copies of an operating system or application in one host cloud, while at the same time running or executing another number of instances of the same operating system or application in another, independent host cloud or clouds. In instances, the set of host clouds may operate independently and with no operating agreement between them. Usage data for the user may therefore not be shared or be visible between those host clouds. In addition, the set of host clouds can also change over time during the course of a week, month, and/or other period, making coordination of subscription details including usage history difficult or impossible.

In cases where the user may subscribe to operating system, application, and/or other software or hardware resources based on subscription levels or limits, it may accordingly be difficult or impossible to keep a running tally of the user's resource consumption on an aggregate basis, across all operative host clouds. If the user, for instance, has a subscription limit of 300 instances of an executing application with a per-cloud limit of 100 instances, and reaches 100 instances in one host cloud at the same time that 90 instances of that application is operating in a second host cloud and 120 are operating in a third cloud, the application provider, individual host clouds, and/or other entities may not be able to timely or accurately determine that the user has reached their instance limit in one cloud, and exceeded their instance threshold in a second cloud. This can occur, for example, because individual host clouds may not have visibility on the resource consumption and/or subscription limits or parameters that may apply in other clouds. Moreover, those entities and their associated billing infrastructure may not be equipped to identify not just over-consumption of resources within certain subscription or usage periods, but also under-consumption of those resources. The individual host clouds and other entities may therefore not be able to accurately apply the user's subscription limits and/or other parameters, such as supplemental billing for over-limit resource consumption, on an aggregate basis. Among other things, this may prevent any individual host cloud, or application provider or other resource provider, from identifying the potential under-consumption of one or more subscribed resources in diverse host clouds that could, in theory, be captured and aggregated to permit the user to receive a credit, offset, and/or other adjustment to their overall subscription costs, on an aggregate basis.

It may be desirable to provide systems and methods for aggregating marginal subscription offsets in a set of multiple host clouds, in which a centralized entitlement engine or other logic can track, maintain, organize and combine relatively short-term consumption records, and potentially generate billing records that contain adjustments or reconciliations of varying under-and-over consumption events across diverse, and possibly unrelated host clouds.

DESCRIPTION

Figure 1:
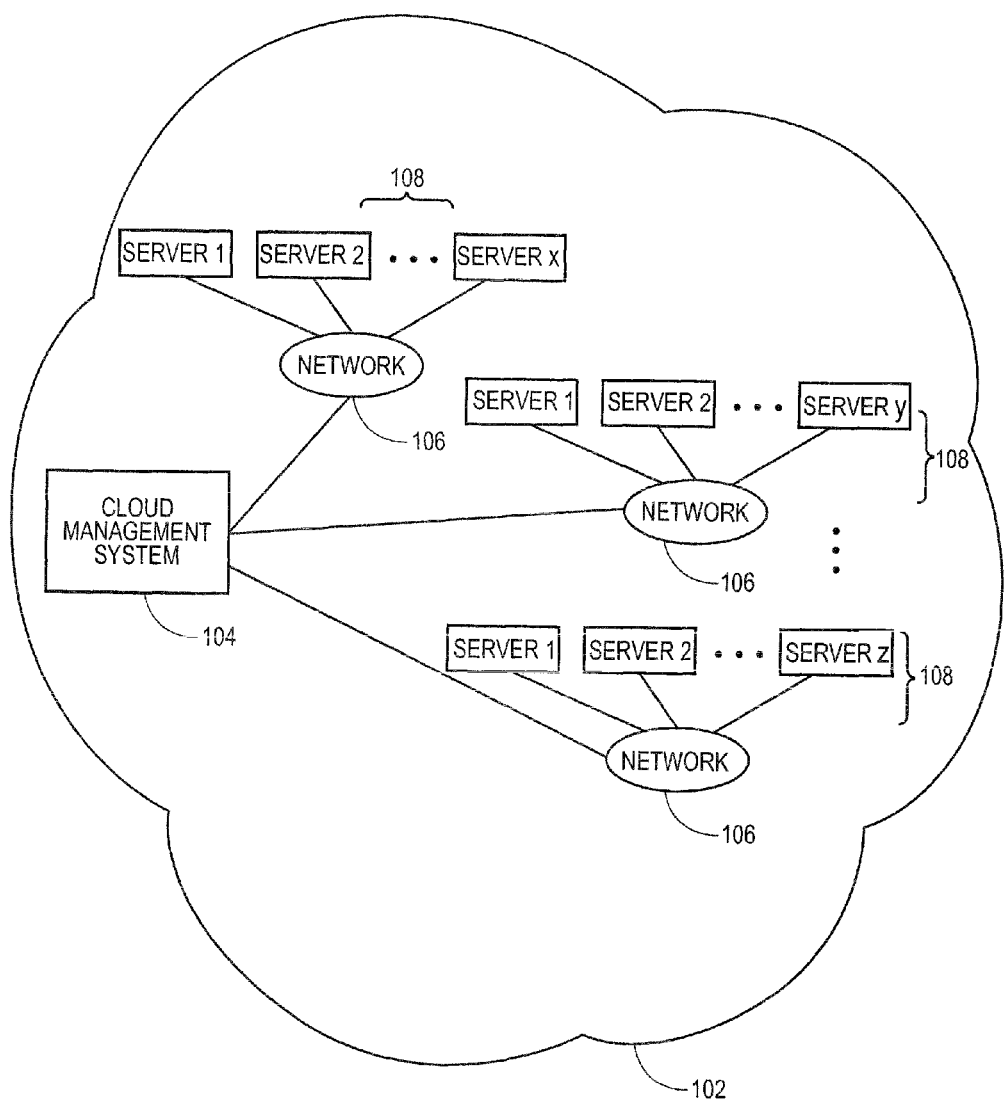
FIG. 1 illustrates an overall cloud system architecture in which various aspects of systems and methods for aggregating marginal subscription offsets in a set of multiple host clouds can be implemented, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
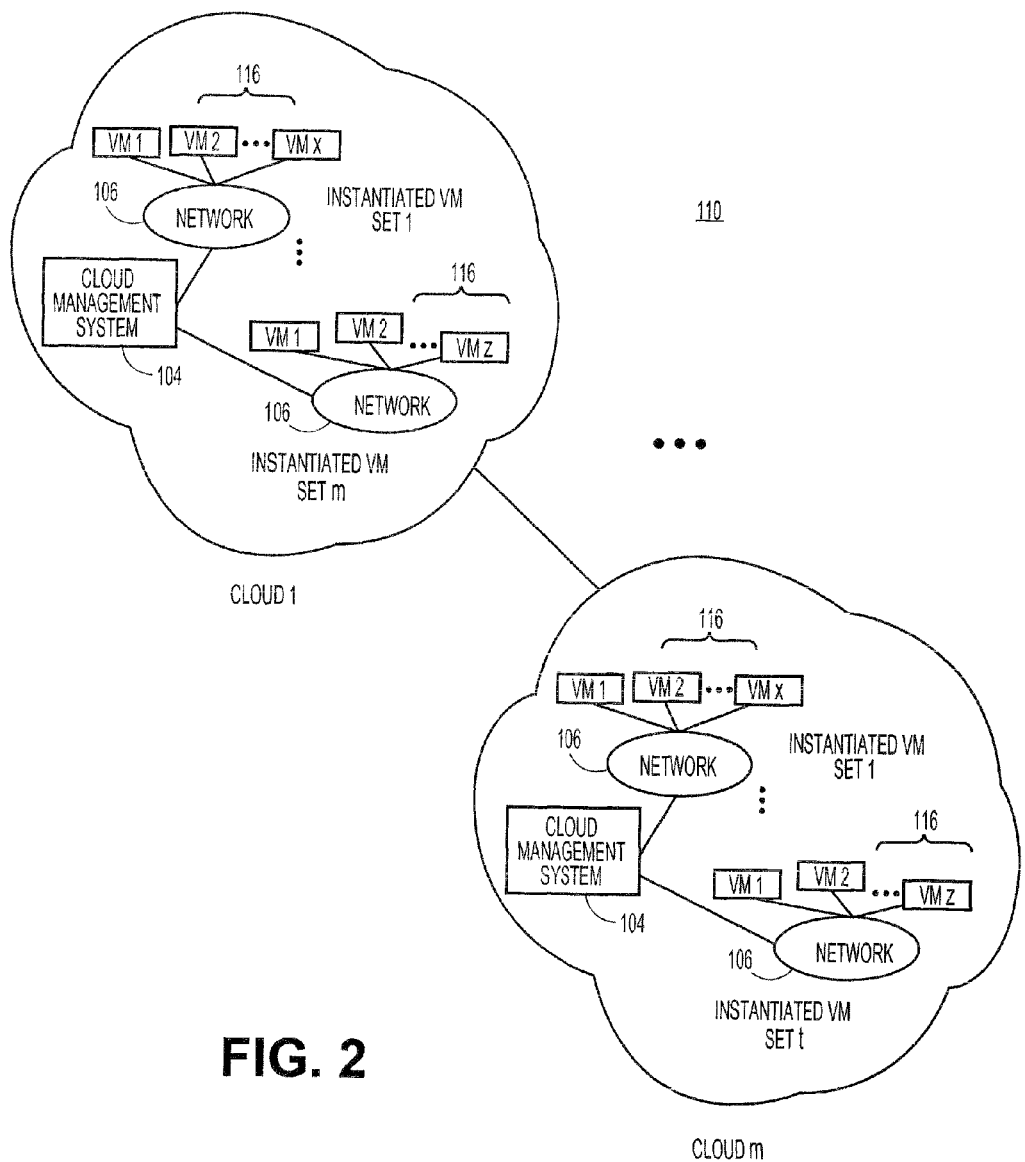
FIG. 2 illustrates an overall cloud system architecture in which various aspects of systems and methods for aggregating marginal subscription offsets in a set of multiple host clouds can be implemented, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
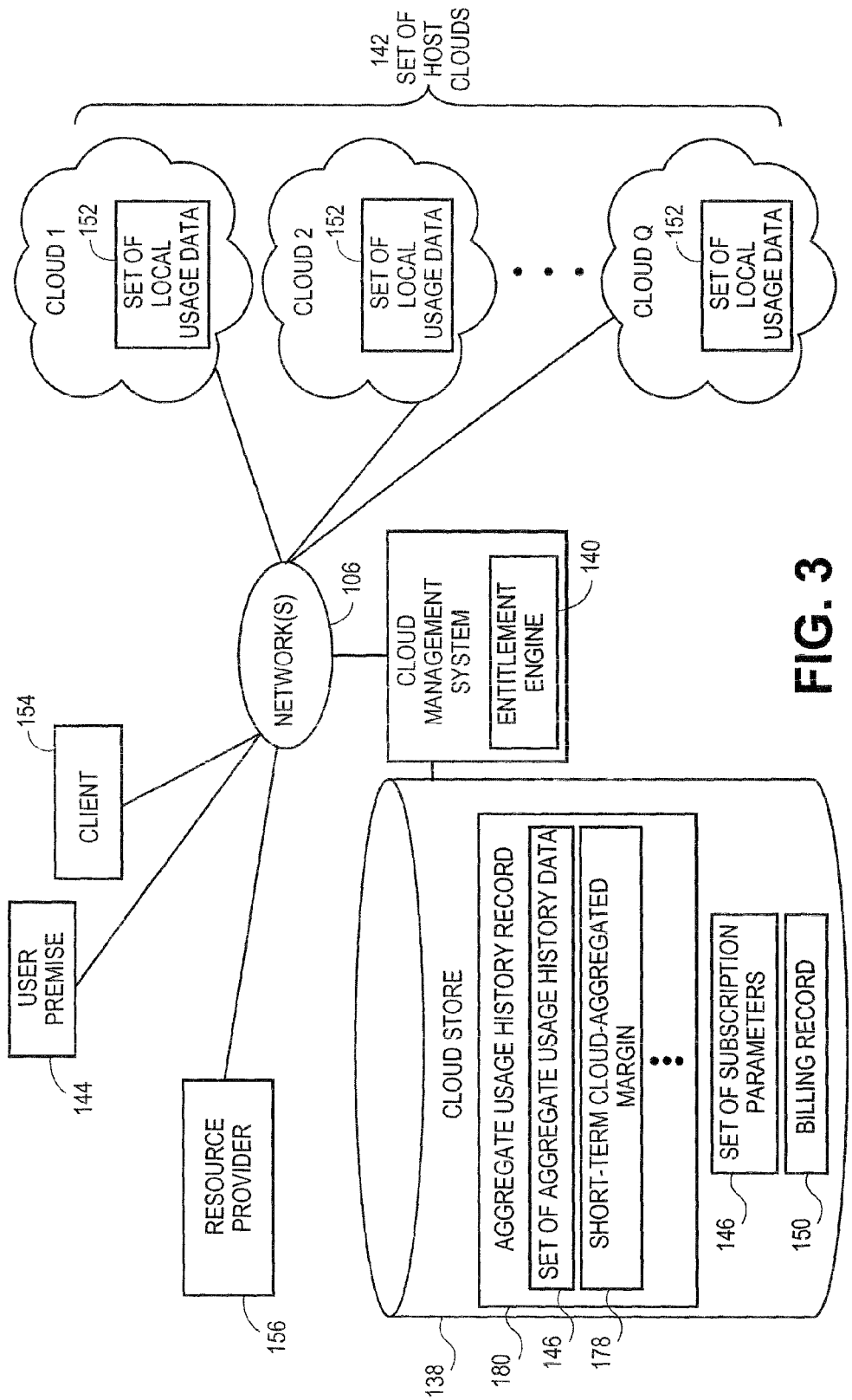
FIG. 3 illustrates a network configuration in which systems and methods for aggregating marginal subscription offsets in set of multiple host clouds can be implemented, including the capture and reconciliation of short-term resource consumption margins across multiple and/or independent host clouds, according to various embodiments.

Aspects of the present teachings relate to platforms and techniques in which a central or distributed entitlement or subscription engine can communicate with each host cloud in a set of host clouds, track marginal consumption rates or values in those clouds, and aggregate and reconcile subscription charges taking the marginal consumption values above or below subscribed limits into account. FIG. 3 shows an illustrative network configuration in which systems and methods for aggregating marginal subscription offsets in set of multiple host clouds can be implemented, according to various embodiments. In embodiments as shown, one or more users can operate a user premise 144, such as a local area network with a set of client machines, and/or other machines or resources. In aspects, the user can in addition or instead operate one or more sets of virtual machines, appliances, and/or other virtual entities (not shown) in a set of host clouds 142. In aspects, the set of host clouds 142 can include a set of diverse and/or otherwise unrelated cloud-based networks to which the user can subscribe for various resources under various subscription terms, criteria, service level agreements, and/or other conditions, which can be recorded or reflected in a set of subscription parameters 146. The set of subscription parameters 146 can for instance be stored in the cloud store 138 hosted or accessed by a cloud management system 104, and/or in other storage resources or locations.

In embodiments as shown, the user can operate a client 154, for instance a client located in or communicating with the user premise 144 to access the set of subscription parameters 146 and other information related to the user's consumption of resources in the set of host clouds 142. In aspects, the consumption of resources in the set of host clouds 142 and generation of related billing events and other subscription-related activities can be tracked and managed by an entitlement engine 140, which can be hosted in the cloud management system 104 and/or in other locations, resources, or services. According to aspects, the entitlement engine 140 can communicate with a one or more resource providers 156, such as the vendors of software such as operating systems, applications, utilities, and/or other programs, services, and/or related resources. The resource provider 156 can maintain part or all of the terms, conditions, limits, criteria, stipulations, and/or other parameters of the user's subscription to one or more resources hosted or provisioned in the set of host clouds 142, and for instance reflected in the set of subscription parameters 146. In embodiments, the relationship between the user premise 144 and the set of host clouds 142 can be configured to operate on a rollover or failover basis, for instance, to provide instances of virtual machines for the user when the installed hardware and associated resources of the user premise 144 is insufficient to support immediate processing, throughput, and/or other demands. In exemplary situations, the user can for instance maintain an entitlement to 1000 instances or other thresholds of an operating system operating or executing at the same time. When the user's workload, potentially including user premise 144, demands more instances than that resource limit, the cloud management system 104 and/or other logic or services can be configured to instantiate additional virtual machines in the set of host clouds 142 to satisfy those short-term demands.

In that scenario, and/or in other scenarios where the user operates virtual machines, virtual appliances, and/or other entities in the set of host clouds 142 on an other than overflow or backup basis, each host cloud in the set of host clouds 142 can capture and store a set of local usage data 152. The set of local usage data 152 can record the consumption or use of resources in a local host cloud in the set of host clouds 142, such as the number of instances of software including operating systems and applications, processor resources, memory resources, communications resources, storage resources, and/or other elements or resources. The entitlement engine 140 can periodically receive the set of local usage data 152 and/or updates to that information from one or more host clouds in the set of host clouds 142. The receipt of the set of local usage data 152 or any portion of the set of local usage data 152 can be performed in aspects on a pull or demand basis, where the entitlement engine 140 and/or other logic can issue commands or instructions to one or more host clouds in the set of host clouds 142, and receive that data back from the interrogated cloud or clouds. In aspects, the set of local usage data 152 can be transmitted to the entitlement engine 140 on a push basis, for instance, on a predetermined, event-triggered, and/or other basis initiated by one or more of the host clouds in set of host clouds 142, themselves. Other channels, schedules, and techniques for the collection of the set of local usage data 152 from any one or more of the set of host clouds 142 can be used.

After receipt of the set of local usage data 152, any portion or component of the set of local usage data 152, and/or updates to the same, the entitlement engine 140 can collect and aggregate the set of local usage data 152 from the various host clouds and organize that data in a set of aggregate usage history data 148. The set of aggregate usage history data 148 can reflect recent and/or accumulated usage consumption by the subject user in all of the set of host clouds 142, over comparatively short-term periods or intervals such as minutes, one or more hours, one day, a number of days, a week, and/or other periods. In aspects, the entitlement engine 140 can collect the set of local usage data 152 regardless of whether each of those clouds is configured to communicate with each other or not. In aspects, the set of aggregate usage history data 148 can present to the entitlement engine 140 and/or other logic the combined resource consumption by the user across the user premise 144 and/or all operating virtual machines or entities, on an hour-by-hour and/or other relatively short-term basis.

According to aspects, the entitlement engine 140 can thereby identify comparatively short-term resource consumption by the user's virtual machines or other entities, sites or nodes, and capture and track that consumption compared to the short-term limits or caps that may be contained in the set of subscription parameters 146 for that user. The entitlement engine 140 can therefore generate or determine a short-term consumption margin for each resource which the user consumes and/or is subscribed to in each cloud in the set of host clouds 142, indicating whether over the course of an hour or other period the consumption rates or values are over the subscription limit for a given resource, under the subscription limit, or at or nearly at the subscription limit for that resource. Both the over and under-consumption margins for each resource can be captured and calculated, from which the entitlement engine 140 can generate a short-term cloud-aggregated margin 178 representing the collective short-term consumption of that resource across the diverse host clouds in set of host clouds 142, resulting in an offset or aggregate consumption value. Deviations from short-term consumption caps, limits, service level agreements (SLAs), and/or other criteria can therefore be combined, averaged, aggregated, and/or otherwise "smoothed out" to more accurately and/or timely reflect the user's consumption patterns. In aspects, the resource provider 156, the cloud operators or providers of the set of host clouds 142, and/or other entities can thereby charge, bill, or otherwise adjust the subscription costs or other factors encoded in the billing record 150 sent to the user, so that their subscription obligations more closely track the user's actual consumption behavior. In aspects, the short-term cloud-aggregated margin 178 can for instance be used to establish short-term marginal subscription costs based on short-term deviations from any subscription consumption limits, which costs can then be combined over different time periods to further average or aggregate the deviations in resource consumption. In aspects, the detection of bursts and relaxations in resource consumption over relatively short-term periods can thereby allow both positive and negative offsets or margins in subscription costs, creating a more accurate assignment of subscription rates.

After detecting the short-term cloud-aggregated margin 178 for each resource of interest, the entitlement engine 140 can generate a billing record 150 reflecting that event, for purposes of notification to the user and collection of billing amounts or other responses. In aspects, the entitlement engine 140 can transmit or forward the billing record 150 to the resource provider 156, such as a software vendor, to produce and transmit to the user under agreed billing arrangements. In aspects, the entitlement engine 140 can transmit or forward the billing record 150 to one or more host clouds in set of host clouds 142, including those in which an over-limit resource usage or other event took place, to potentially transmit to the user for similar purposes. In aspects, the resource provider 156 and one or more cloud operators or cloud providers of the set of host clouds 142 can maintain agreements or arrangements for the capture and forwarding of the billing record 150, and the collection of any billing amounts or credits paid by the user. In aspects, the resource provider 156 and the host cloud providers or operators can establish arrangements to share or distribute any overage payments or other payments or credits received from users between themselves. According to aspects, the monitoring and billing capture of short or long-term over-limit resource consumption can therefore be conducted, on a marginal offset or other basis, even in instances where each host cloud in set of host clouds 142 is not aware of subscription limits contained in the set of subscription parameters 146, and/or the local usage data 152 of one or more of the set of host clouds 142 is not visible to other host clouds and/or to other participants in the cloud-based network.

Figure 4:
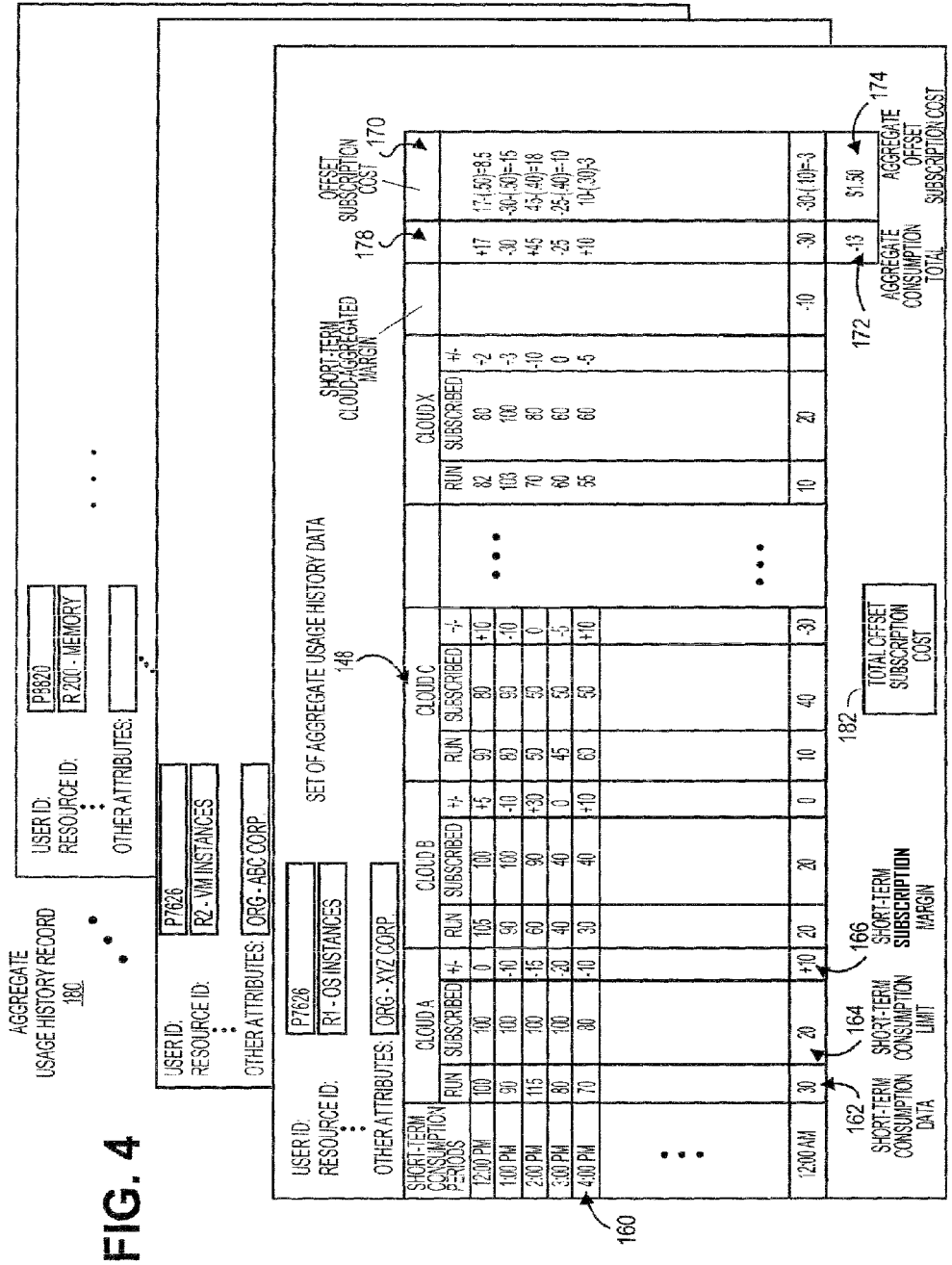
FIG. 4 illustrates an exemplary data structure in which the capture and aggregation of marginal resource consumption data can be encoded and stored, according to various aspects.

In terms of data capture of the usage, subscription, billing and related information used to detect and record marginal resource consumption and/or other events, FIG. 4 illustrates an aggregate usage history record 180 that can be used to store the set of aggregate usage history data 148 that can store and encode various data, attributes, criteria, and/or other information used to track and manage a user's differential or marginal resource consumption in the set of host clouds 142 and/or other host sites. In aspects, the aggregate usage history record 180 can be encoded as a relational or other database, table, tree, file, object, and/or other data store or data structure. In aspects as shown, the set of aggregate usage history data 148 encoded and stored in the aggregate usage history record 180 can include tables, entries, values, attributes, and/or other information including set of short-term consumption data 162 reflecting the usage of one or more resources in the set of host clouds 142 by the user over one or more short-term consumption periods 160. In aspects, the one or more short-term consumption periods 160 can be or include a variety of periods or intervals, such as one-hour intervals (as shown), but can also be or include other periods or intervals, such as 1, 5, 10, 15, and/or 30 minutes, 2 hours, 8 hours, 12 hours, one day or 24 hours, 3 days, one week, and/or other time intervals or periods. In aspects, the one or more short-term consumption periods 160 can reflect a period or interval (or periods or intervals) that is/are shorter than the period called for in the set of subscription parameters 146 as the basic or defined interval in terms of resource consumption limits or levels, service level agreements (SLAs), and/or other subscription criteria or settings. In aspects, the short-term subscription period 160 can be defined to be equal to the period(s) or interval(s) defined by the set of subscription parameters 146. In aspects, the value, length, or short-term nature of the one or more short-term consumption periods 160 can be viewed as flexible or configurable, rather than defined as a strict number of minutes, hours, days, and/or weeks or other units. In aspects, the short-term subscription period 160 can be set or configured by a user, such as the cloud provider(s) or cloud operator (s) of the set of host clouds 142, by the one or more resource providers 156, by the user whose set of aggregate usage history data 148 is being track and administered, and/or by other users or entities. In aspects, a record can be kept in the aggregate usage history record 180 recording, for each cloud in the set of host clouds 142 in which the user subscribes and/or uses or consumes resources, the short-term consumption data 162 indicating an amount, rate, or other metric of resource consumption over each of the one or more short-term consumption periods 160.

In aspects as shown, the aggregate usage history record 180 can likewise include, for each cloud in the set of host clouds 142 and each resource consumed or used in that cloud, the short-term consumption limit 164 for that user based on the user's set of subscription parameters 146 and/or other information. In aspects, the entitlement engine 140 and/or other logic can generate and store a short-term subscription margin 166 reflecting the user's deviation in terms of under-consumption or over-consumption of each resource for which the user has a short-term subscription limit 164. The short-term subscription margin 166 can thereby reflect, on a comparatively short-term basis, such as every 15 or 30 minutes, hour, 8 hour, one-day or other period, the marginal amount by which the user's consumption of a subscribed resource is fluctuating and possibly deviating from the short-term consumption limit 166. In aspects, the entitlement engine 140 and/or other logic can similarly collect and sum or aggregate the short-term subscription margin 166 over each host cloud in the set of host clouds 142 in which the user is using or consuming the subject resource to generate a short-term cloud-aggregated margin 178, representing the comparatively short-term or immediate net consumption of the resource over the set of host clouds 142. The short-term cloud-aggregated margin 178 can be calculated and stored for each hour and/or other period represented by the one or more short-term consumption periods 160, for instance over the course of one day, one week, one month, and/or other interval.

In aspects as shown, the entitlement engine 140 and/or other logic can further calculate and store an aggregate consumption total 172 over a defined period, such as a one-day or other period, summing or aggregating the short-term cloud-aggregated margin 178 for a resource for one user over that period. In aspects, the aggregate consumption total 172 can thereby encode the combined, net, averaged, and/or otherwise aggregated effect of the various under and over-limit consumption events by the user in the set of host clouds 142 over 24 hours, or other predetermined interval. The entitlement engine 140 and/or other logic can, in addition, also calculate and store a set of offset subscription costs 170 reflecting the costs, surcharges, credits, and/or other adjustments for each hour and/or other period in the one or more short-term consumption periods 160 for a particular resource across the set of host clouds 142. A resource provider, cloud operator, and/or other entity may be entitled, for instance, to an overage subscription fee or charge at a rate of $0.50 per instance for operating system (OS) instances over the short-term consumption limit 164 based on that usage, and/or other adjustments or factors. In aspects, the set of offset subscription costs 170 can be computed at a fixed rate, and/or at a dynamically adjusted rate, for instance based on time of time, total resource consumption, and/or other parameters. The entitlement engine 140 and/or other logic can also generate an aggregate offset subscription cost 174 which combines or sums the set of offset subscription costs 170 for each of the one or more short-term consumption periods 160 for a predetermined period, such as one day, one week, one month, and/or other period or interval. The aggregate offset subscription cost 174, and other consumption variables and cost factor, can in aspects thereby more accurately correspond to the user's overall rate or absolute amount of resource consumption in the set of host clouds 142. In embodiments, the entitlement engine 140 and/or other logic can in addition combine, sum, and/or otherwise aggregate or net the aggregate offset subscription cost 174 for multiple individual resources whose consumption data in turn has been aggregated across multiple host clouds in the corresponding aggregate offset subscription cost 174, to generate a total offset subscription cost 182. In aspects, the total offset subscription cost 182 can encapsulate the net marginal resource usage by the user against all short-term consumption limits 164 with associated costs or credits across all host clouds in the set of host clouds 142, all subscribed resources, and/or all daily or other operative time periods constructed from the one or more short-term consumption periods 160.

Figure 5:
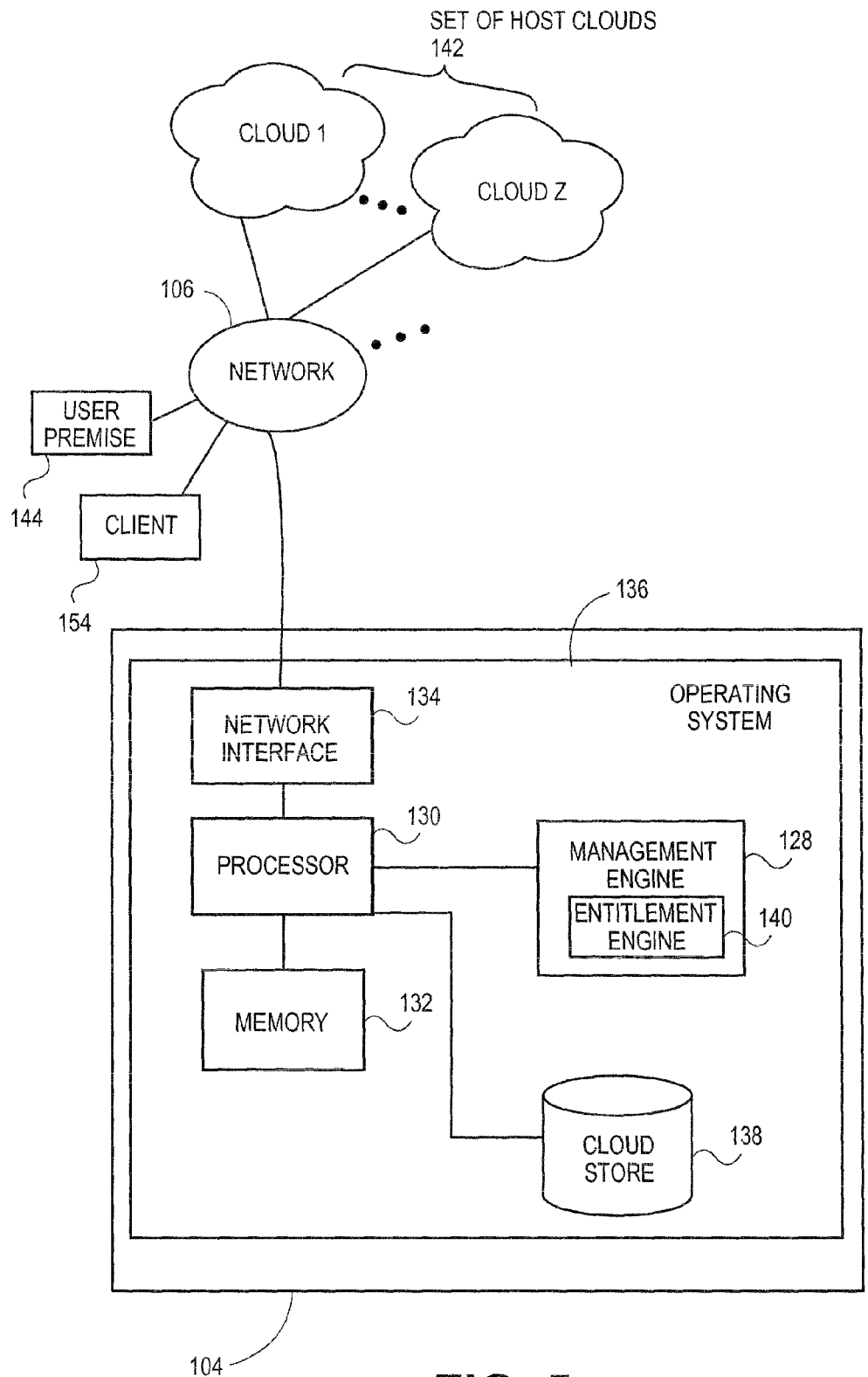
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, entitlement engine 140, user premise 144, client 154, set of host clouds 142, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of host clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the entitlement engine 140, the set of subscription parameters 146, the set of usage history data 148, the user premise 144, the client 154, the set of host clouds 142, and/or other interfaces, applications, machines, sites, services, data, and/or logic. Other configurations of the cloud management system 104, associated network connections, and other hardware, software, and service resources are possible. It may be noted that in embodiments, the client 154, and/or other hardware machines, platforms, or engines can comprise the same or similar resources as cloud management system 104, or can be configured with different hardware and software resources.

Figure 6:
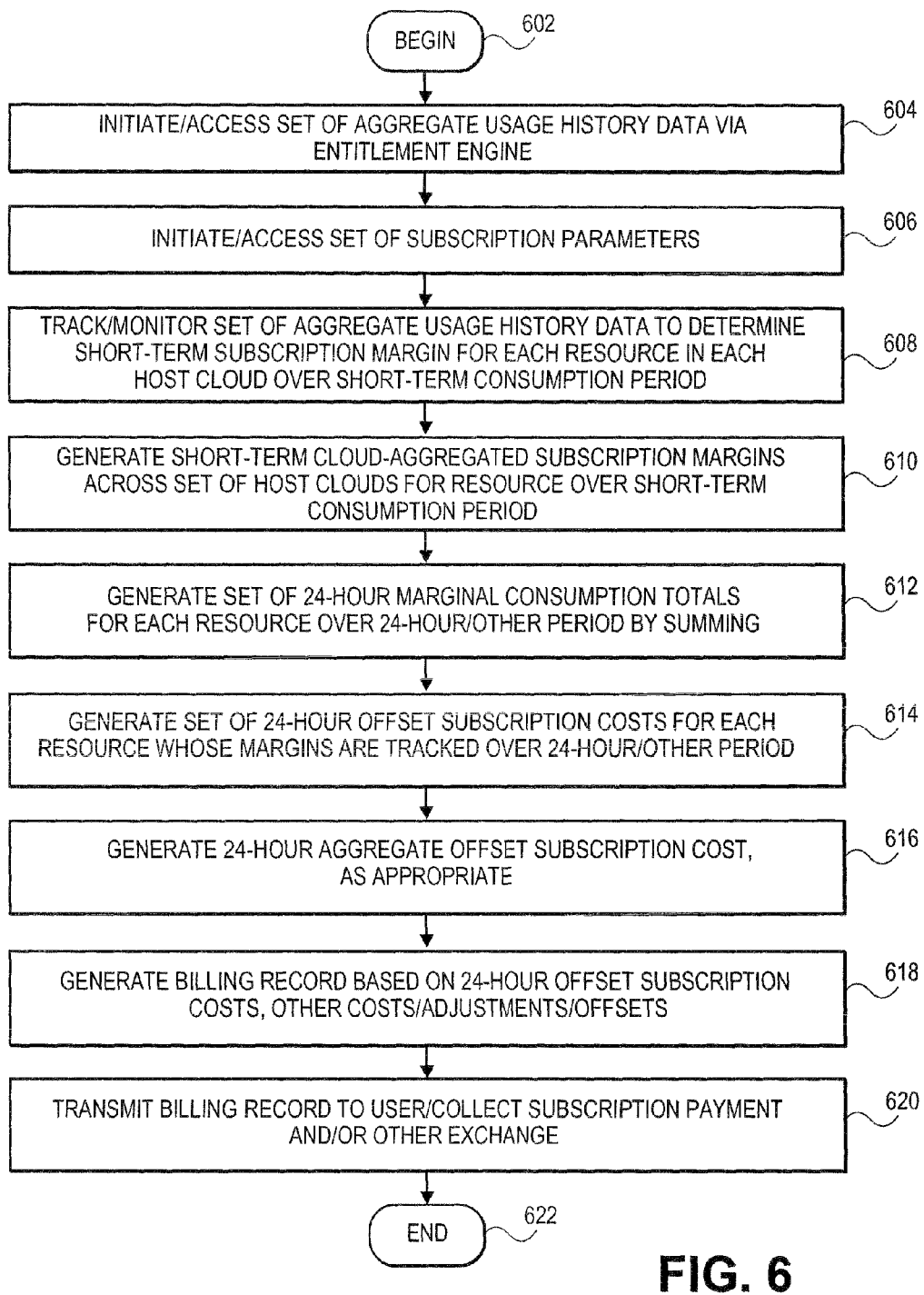
FIG. 6 illustrates a flowchart for the analysis and processing of short-term resource consumption by a user in different clouds, and the reconciliation of different marginal consumption values across those clouds in an aggregate or offset subscription cost, that can be used in systems and methods for aggregating marginal subscription offsets in a set of multiple host clouds, according to various embodiments.

FIG. 6 illustrates a flowchart of overall processing to perform the tracking of resource consumption, management of subscription parameters, short-term billing capture and margin reconciliation and related activities, according to various embodiments of the present teachings. In 602, processing can begin. In 604, an administrator or other user can initiate and/or access the set of aggregate usage history data 148 via the entitlement engine 140 and/or other logic. In 606, an administrator or other user can initiate and/or access the set of subscription parameters 146, indicating, for instance, resource consumption rates, limits, caps, and/or other subscription parameters or factors by which the user can subscribe to resources of the set of host clouds 140. In 608, the entitlement engine 140 and/or other logic can track, register, and/or monitor the set of aggregate usage history data 148 to determine the short-term subscription margin 166 for each resource to which the user subscribes, in each host cloud in set of host clouds 142 to which the user is registered. In aspects, the short-term subscription margin 166 can be tracked or monitored for each period in the set of short-term subscription periods 160. In aspects, the set of short-term subscription periods 160 can be or include one or more periods such as, for instance, one-hour periods as shown, and/or can also or instead include other periods such as periods or intervals of 1, 5, 10, 15, or 30 minutes, 8-hour periods, 12-hour periods, 24-hour periods, and/or other periods or intervals. In aspects, the set of short-term subscription periods 160 can correspond to the short time periods tracked by the cloud management system, the entitlement engine 140, the set of host clouds 142, and/or other cloud logic or infrastructure. In aspects, the one or more short-term consumption periods 160 can comprise equally-spaced intervals, and/or can include intervals of different durations or lengths.

In 610, the entitlement engine 140 and/or other logic can sum the short-term subscription margin 166 across all host clouds for each period of the one or more short-term consumption periods 160 to generate the short-term cloud-aggregated margin 178 for that respective period. For instance, in exemplary records as shown in FIG. 4, the number of operating system (OS) instances instantiated and/or run by the user in a given hour across the set of host clouds 142 can be totaled, so that instances of under-limit consumption offset instances of over-limit consumption, resulting in a net short-term cloud-aggregated subscription margin 178 for the one or more short-term consumption periods 160 across all host clouds. In cases, the short-term cloud-aggregated margin 178 may reflect a net over-consumption (positive) value for that hour or other period (as illustratively shown), or can reflect an under-consumption (negative) value for that same period. A zero margin (at-limit) value can also be reflected.

In 612, the entitlement engine 140 and/or other logic can generate the set of marginal consumption totals 172 reflecting the total combined short-term subscription margin 166 for each resource being tracked over a 24-hour, or other interval or period. For example, and as shown for instance in FIG. 4, the under-limit (e.g. recorded as a negative value) and over-limit (e.g. recorded as a positive value) margins or increments of consumption under or over the short-term consumption limit 164 for each one or more short-term consumption periods 160 can be summed or combined to determine the short-term cloud-aggregated margin 178 for each respective resource over a 24-hour period. In aspects, other periods or intervals other than a 24-hour period can be used to sum the values reflected in the short-term cloud-aggregated margin 178. The values reflected in the short-term cloud-aggregated margin 178 can thereby reflect the netting out of the under-consumption and over-consumption values for a given resource in two or more dimensions, namely over two or more host clouds, and over multiple instances of the one or more short-term consumption periods 160, averaging out consumption fluctuations in the user's subscription space in relation to the set of short-term consumption limits 164.

In 614, the entitlement engine 140 and/or other logic can generate the set of offset subscription costs 170 for each one or more short-term consumption periods 160 corresponding to the short-term cloud-aggregated margin 178 for each subscribed resource. For instance, if the record for a given one or more short-term consumption periods 160 reflects the over-consumption of 20 operating system instances, the assigned overage cost of that usage may be, for instance, $0.50 times 20 instances, or $10.00 for that hour or other period. In 616, the entitlement engine 140 and/or other logic can generate the aggregate offset subscription cost 174 for one 24-hour or other period, representing the combination of the set of offset subscription costs 170 over a multiple number of the one or more short-term consumption periods 160, such as the combination of 24 one-hour periods, or other intervals, periods, or multiples. In 618, the entitlement engine 140 and/or other logic can generate the billing record 150 based on the aggregate offset subscription cost 174 for each resource being tracked and/or metered for the user, and/or based on other costs, adjustments, offsets, and/or factors. In 622, the entitlement engine 140 and/or other logic, entities, or resources, such as the operator of the set of host clouds 142, can transmit the billing record 150 to the user and/or other recipient. In 624, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. For further example, while embodiments have been described in which a user connects to or accesses the entitlement engine 140 via one client 154, in embodiments, multiple clients, portals, services, and/or other access points to the entitlement engine 140 can be used. Likewise, while embodiments have been described in which one entitlement engine 140 operates to manage the resource consumption, billing, and/or other activities of one or more users in a set of host clouds 142, in embodiments, multiple deployment engines and/or other logic or services can perform the same or similar logic to manage deployment options. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
   accessing a set of aggregate usage history data for a user operating a set of machines consuming a set of resources in a set of host clouds;
   determining consumption of at least one resource for at least one time period, wherein the consumption is determined for the at least one resource in each of at least two host clouds of the set of host clouds;
   generating, by a processing device, a set of subscription margins for the at least one resource for each of the at least two host clouds in view of a comparison of the consumption of the at least one resource in a corresponding host cloud to a resource subscription limit associated with the corresponding host cloud;
   generating a set of short-term cloud-aggregated margins, wherein each of the set of short-term cloud-aggregated margins represents an offset consumption value for the corresponding resource across the at least two host clouds;
   generating a plurality of offset subscription costs for the at least one resource for the at least one time period across the at least two of the set of host clouds in view of the set of short-term cloud-aggregated margins; and
   generating an aggregate offset subscription cost for the at least one resource for the at least one time period in view of the plurality of offset subscription costs.

2. The method of claim 1, wherein the set of subscription margins comprises at least one of an over-limit consumption value for the at least one resource or an under-limit consumption value for the at least one resource.

3. The method of claim 1, wherein the at least one time period comprises at least one of a fifteen minute time period, a one hour time period, a one day time period, a one week time period, or a one month time period.

4. The method of claim 1, wherein the set of subscription margins specifies amounts of deviation of the consumption of the at least one resource in the corresponding host cloud from the associated resource subscription limit.

5. The method of claim 1, wherein the at least one time period aggregates to at least one of a 24 hour period, a one week period, or a one month period.

6. The method of claim 1, wherein the at least one resource comprises a plurality of resources.

7. The method of claim 6, further comprising:
   aggregating the offset subscription cost for each of the plurality of resources for the at least one time period to generate the aggregate offset subscription cost for the at least one time period.

8. The method of claim 1, further comprising:
   generating a billing record in view of the plurality of offset subscription costs for the at least one resource for the at least one time period.

9. The method of claim 1, wherein the set of aggregate usage history data comprises a set of usage history captured from a user premise installation independent of the set of host clouds.

10. The method of claim 1, wherein the set of aggregate usage history data comprises at least one of processor usage data, memory usage data, storage usage data, communications bandwidth usage data, operating system usage data, application usage data, service usage data, virtual machine instance data, or appliance usage data.

11. The method of claim 1, wherein the resource subscription limit comprises at least one of an instance limit for a set of virtual machines, an instance limit for a set of appliances, an instance limit for an operating system, an instance limit for at least one application, a communications bandwidth throughput limit, or a storage amount limit.

12. A system, comprising:
   an interface to a data store, wherein the data store is to store a set of aggregate usage history data for a user operating a set of machines consuming a set of resources in a set of host clouds; and
   a processing device, to communicate with the data store via the interface, the processing device to:
      access the set of aggregate usage history data for the user;
      determine consumption of at least one resource for at least one time period, wherein the consumption is determined for the at least one resource in each of at least two host clouds of the set of host clouds;
      generate a set of subscription margins for the at least one resource for each of the at least two host clouds in view of a comparison of the consumption of the at least one resource in a corresponding host cloud to a resource subscription limit associated with the corresponding host cloud;

generate a set of short-term cloud-aggregated margins, wherein each of the set of short-term cloud-aggregated margins represents an offset consumption value for the corresponding resource across the at least two host clouds;

generate a plurality of offset subscription costs for the at least one resource for the at least one time period across the at least two of the set of host clouds in view of the set of short-term cloud-aggregated margins; and generate an aggregate offset subscription cost for the at least one resource for the at least one time period in view of the plurality of offset subscription costs.

13. The system of claim 12, wherein the set of subscription margins comprises at least one of an over-limit consumption value for the at least one resource or an under-limit consumption value for the at least one resource.

14. The system of claim 12, wherein the at least one time period comprises at least one of a fifteen minute time period, a one hour time period, a one day time period, a one week time period, or a one month time period.

15. The system of claim 12, wherein the set of subscription margins specifies amounts of deviation of the consumption of the at least one resource in the corresponding host cloud from the associated resource subscription limit.

16. The system of claim 12, wherein the at least one time period aggregates to at least one of a 24 hour period, a one week period, or a one month period.

17. The system of claim 12, wherein the at least one resource comprises a plurality of resources.

18. The system of claim 17, wherein the processing device is further to aggregate the offset subscription cost for each of the plurality of resources for the at least one time period to generate the aggregate offset subscription cost for the at least one time period.

19. The system of claim 12, wherein the set of aggregate usage history data comprises at least one of processor usage data, memory usage data, storage usage data, communications bandwidth usage data, operating system usage data, application usage data, service usage data, virtual machine instance data, or appliance usage data.

20. The system of claim 12, wherein the resource subscription limit comprises at least one of an instance limit for a set of virtual machines, an instance limit for a set of appliances, an instance limit for an operating system, an instance limit for at least one application, a communications bandwidth throughput limit, or a storage amount limit.

* * * * *